UNITED STATES PATENT OFFICE.

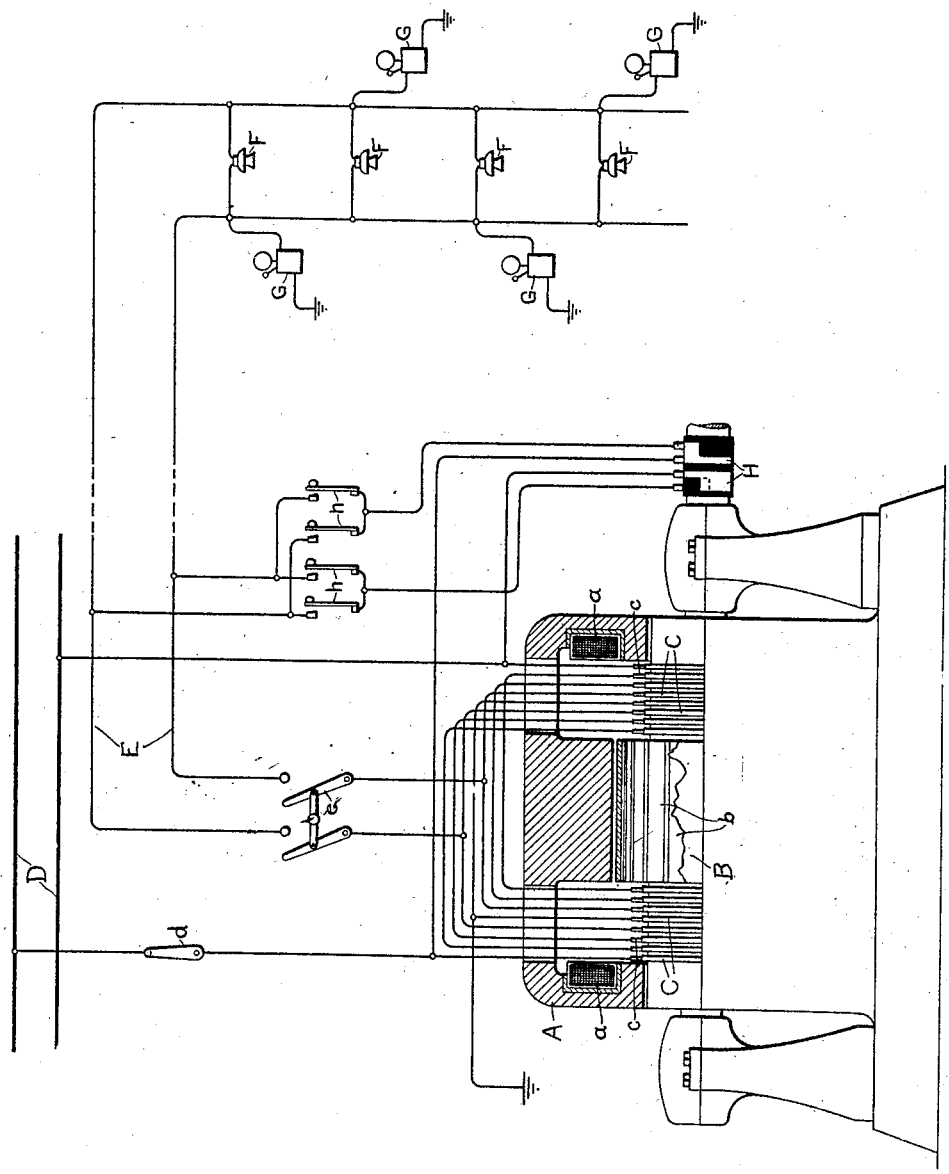
J. L. HALL.
SUPPLY SYSTEM FOR TELEPHONE CIRCUITS.
APPLICATION FILED JUNE 8, 1906.
925,093.
Patented June 15, 1909.
Witnesses:
Inventor:
John L. Hall.
by Albert G. Davis
Atty.

JOHN L. HALL, OF SCHENECTADY, NEW YORK, ASSIGNOR TO GENERAL ELECTRIC COMPANY, A CORPORATION OF NEW YORK.

SUPPLY SYSTEM FOR TELEPHONE-CIRCUITS.

No. 925,093.  Specification of Letters Patent.  Patented June 15, 1909.

Application filed June 8, 1906. Serial No. 320,746.

*To all whom it may concern:*

Be it known that I, JOHN L. HALL, a citizen of the United States, residing at Schenectady, county of Schenectady, State of New York, have invented certain new and useful Improvements in Supply Systems for Telephone-Circuits, of which the following is a specification.

My invention relates to current-supply systems for telephone circuits, and its object is to provide a novel and efficient system for this purpose.

In attempting to employ direct-current dynamo-electric machines heretofore, it has been found that the small pulsations in the current as the different commutator segments pass under the brush is sufficient to interfere with the satisfactory operation of the telephone, unless auxiliary means, such as storage batteries or large choke-coils are employed to prevent the pulsations. Both batteries and choke-coils are costly and inefficient.

A dynamo-electric machine having a uniform homopolar field gives a perfectly uniform current without any pulsations whatever, and consequently may be connected directly to a telephone circuit without the use of any auxiliary devices for maintaining an even current flow. Such a machine may furthermore be connected so as to be driven electrically as a rotary converter from a supply circuit for this purpose.

The machine may be formed with a number of armature conductors connected in series so that the armature terminals may be connected to a source of comparatively high voltage, such, for instance, as a lighting circuit, while the leads for the telephone circuit may be connected to intermediate points of the armature circuit across only a portion of the conductors. In this way, the machine acts as a rotary transformer, reducing the voltage to the desired amount and smoothing out the current so as to remove small pulsations received from the lighting circuit.

My invention will best be understood by reference to the accompanying drawing, which shows somewhat diagrammatically a telephone supply system arranged in accordance with my invention.

In the drawing A represents the field magnet of a dynamo-electric machine which is arranged to give a uniform homopolar field.

$a\ a$ represent the field coils which extend circumferentially around the shaft, and which may be excited from any suitable source of constant current, as by connecting them across the armature terminals or to a separate source of current.

B represents the revolving armature, which carries a plurality of armature conductors $b$. These conductors are connected at opposite ends to collector rings C, and by means of brushes $c$ and cross-connections between the brushes the armature conductors may all be connected in series. The terminals of the armature circuit are shown connected through a switch $d$ to the line-wires D representing a suitable source of current, such, for instance, as a lighting circuit.

The line-wires E of a telephone circuit are connected through a switch $e$ to intermediate points in the armature circuit across only a portion of the armature conductors. The voltage delivered to the telephone circuit E consequently bears the same relation to the voltage of the lighting circuit D as the number of conductors across which the telephone circuit is connected bears to the total number of armature conductors in series. The machine thus acts as a voltage transformer, and it further acts to smooth out the small pulsations in the current received from the lighting mains and to deliver a perfectly even current to the telephone circuit.

Telephonic devices F are indicated diagrammatically as connected across the telephone circuit E, and bells or call-magnets G are shown connected between the line-wires E and ground. The armatures of these magnets may be polarized in a manner frequently employed for party-lines, so that by sending a pulsating current through either line-wire to ground one bell only may be operated. For the purpose of delivering this pulsating current two make-and-break contact devices H are mounted on the shaft of the unipolar generator and the central point of the armature circuit of the generator is grounded. By closing the proper switch $h$ either line-wire may be connected to either device H, which acts to connect the line-wire intermittently to one armature terminal. Thus a pulsating current of either polarity may be sent over either line-wire for selectively operating either call-magnet connected to that wire.

If desired, the machine may be disconnected from the lighting circuit by opening the switch $d$, and driven from any suitable source of mechanical power, so as to act as a generator.

What I claim as new and desire to secure by Letters Patent of the United States is,—

1. In combination, a dynamo-electric machine having a uniform homopolar field magnet, means for producing a constant magnetization thereof, a plurality of armature conductors, and collecting devices and connections for placing said conductors in series, a supply circuit connected across certain of said conductors, a load-circuit connected across certain of said conductors, and telephones connected to said load-circuit.

2. In combination, a dynamo-electric machine having a uniform homopolar field magnet, means for producing a constant magnetization thereof, a plurality of armature conductors, and collecting devices and connections for placing said conductors in series, a supply circuit connected to the terminals of the armature circuit, a load circuit connected across a portion only of said conductors, and telephones connected to said load-circuit.

3. In combination, a dynamo-electric machine having a uniform homopolar field magnet, means for producing a constant magnetization thereof, a plurality of armature conductors, and a collecting device and connections for placing said conductors in series, a circuit connected across a portion only of said conductors, and telephones connected to said circuit.

4. In combination, a dynamo-electric machine having a uniform homopolar field magnet, means for producing a constant magnetization thereof, line-wires connected to said machine, telephones connected across said line-wires, polarized call-magnets connected between said line-wires and earth, means for connecting either terminal of said machine intermittently to either line-wire, and an earth connection to the center of the armature circuit of the machine.

5. In combination, a dynamo-electric machine having a uniform homopolar field magnet, means for producing a constant magnetization thereof, line-wires connected to said machine, telephones connected across said line-wires, polarized call-magnets connected between said line-wires and earth, an earth connection to the center of the armature circuit of the machine, two make-and-break devices on the shaft of the machine connected to the respective terminals of the armature circuit, and switches for connecting either device to either line-wire.

6. In combination, a dynamo-electric machine having a uniform homopolar field, means for producing a constant magnetization thereof, a plurality of armature conductors, and collecting devices and connections for placing said conductors in series, a supply circuit connected to the terminals of the armature circuit, line-wires connected to intermediate points on the armature circuit, telephones connected across said line-wires, polarized call-magnets connected between the line-wires and earth, an earth connection to the center of the armature circuit of the machine, and means for connecting either armature terminal intermittently to either line-wire.

In witness whereof, I have hereunto set my hand this 7th day of June, 1906.

JOHN L. HALL.

Witnesses:
BENJAMIN B. HULL,
HELEN OXFORD.